United States Patent [19]

Sugasawa et al.

[11] 4,207,856
[45] Jun. 17, 1980

[54] I. C. ENGINE OPERABLE IN PART-CYLINDER MODE

[75] Inventors: Fukashi Sugasawa, Yokohama; Noburu Fukasawa, Kamakura; Haruhiko Iizuka, Yokosuka; Akitoshi Mumura, Tokorozawa, all of Japan;

[73] Assignee: Nissan Motor Company, Limited, Yokohama, Japan

[21] Appl. No.: 922,348

[22] Filed: Jul. 6, 1978

[30] Foreign Application Priority Data

Jul. 15, 1977 [JP] Japan ................... 52-85263
Jul. 15, 1977 [JP] Japan ................... 52-85264
Jul. 15, 1977 [JP] Japan ................... 52-85265

[51] Int. Cl.² ......................................... F02D 17/02
[52] U.S. Cl. ........................... 123/198 F; 123/32 EA; 123/124 R
[58] Field of Search .......... 123/198 F, 32 EA, 124 R, 123/32 EC, 32 ED, 32 EA, 32 EH, 32 EL, 119 D

[56] References Cited

U.S. PATENT DOCUMENTS

| | | | |
|---|---|---|---|
| 2,947,928 | 8/1960 | Dolza | 123/198 F |
| 3,578,116 | 5/1971 | Nakajima | 123/198 F |
| 3,698,371 | 10/1972 | Mitsuyama et al. | 123/198 F |
| 4,080,947 | 3/1978 | Iizuka | 123/198 F |
| 4,109,634 | 8/1978 | Ganabedian | 123/198 F |

*Primary Examiner*—Ira S. Lazarus

[57] ABSTRACT

An intake air control system of a fuel-injection internal combustion engine which is operable in a part-cylinder mode. With the system, there is provided an additional increase in the effective air flow area through an air induction system leading to the engine cylinders in response to a signal representing the part-cylinder mode operation, so that with the same depression degree of an accelerator pedal a sufficient amount of air will be fed to the selected ones of the engine cylinders after the engine operation has switched from full-cylinder mode to part-cylinder mode.

4 Claims, 25 Drawing Figures

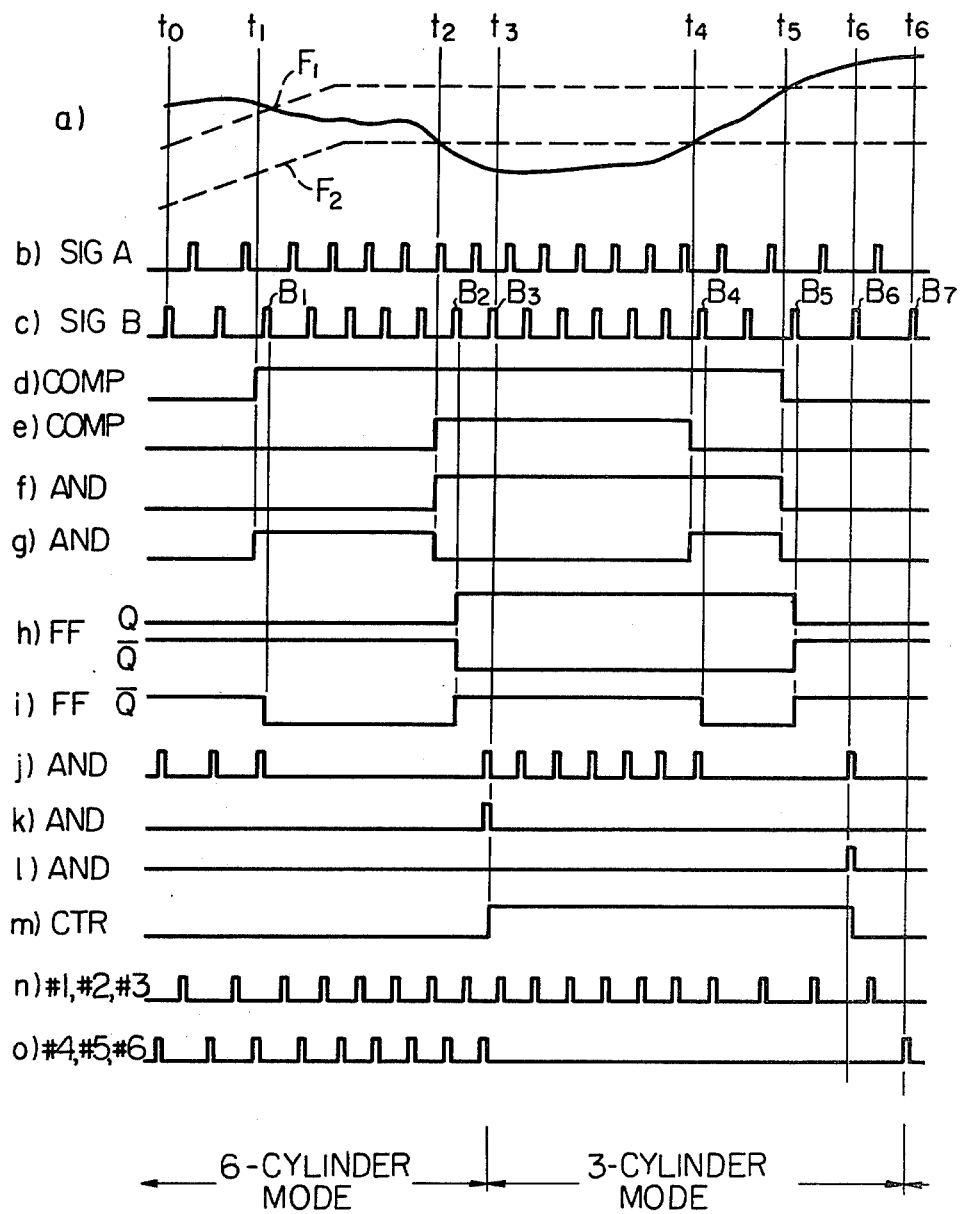

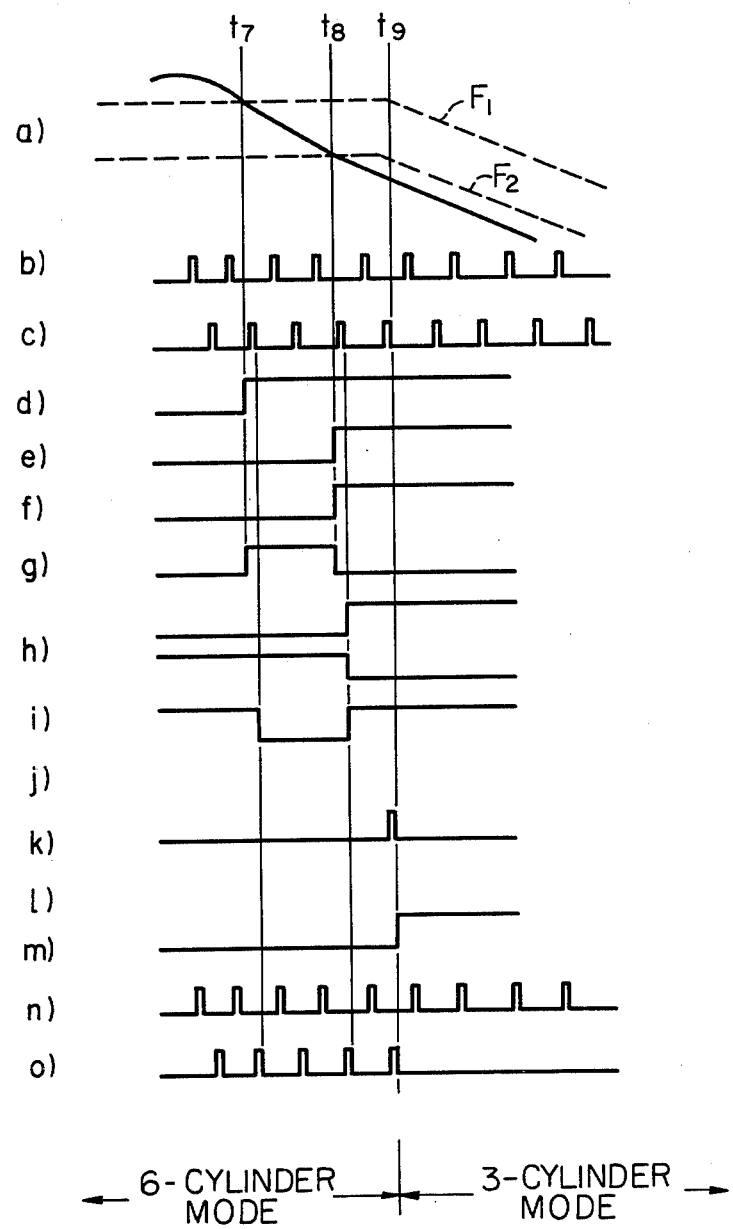

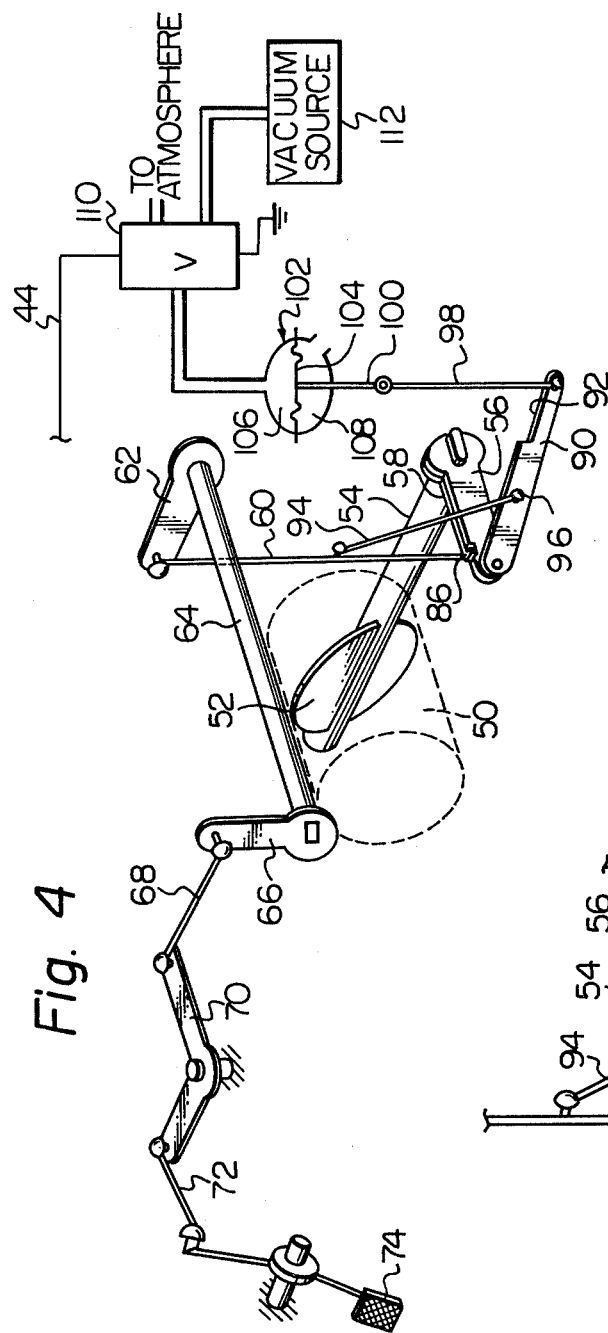

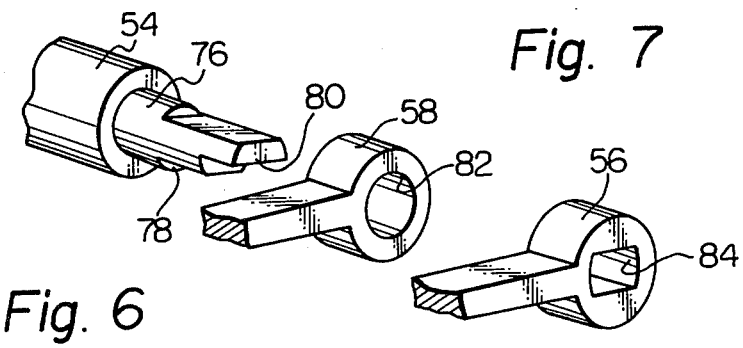
Fig. 7
Fig. 6
Fig. 8
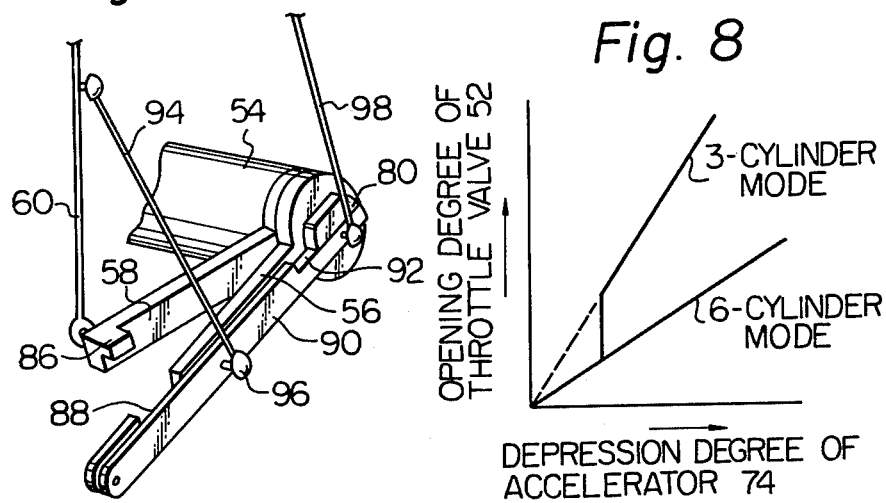
Fig. 9
Fig. 10
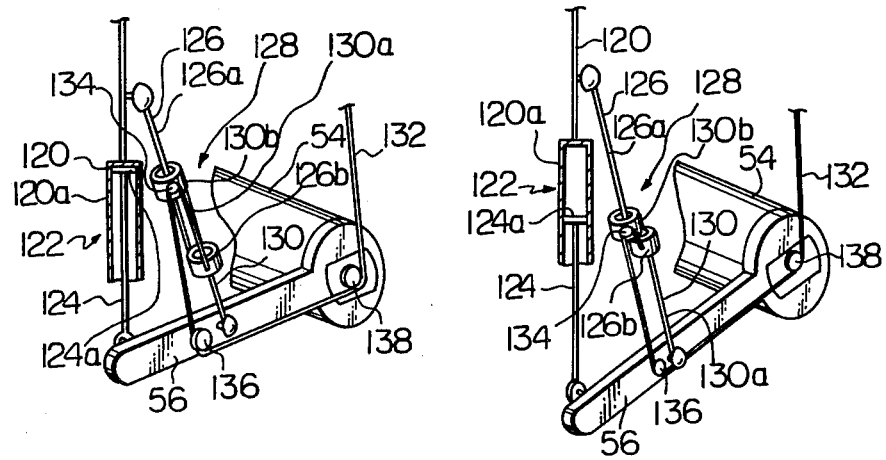

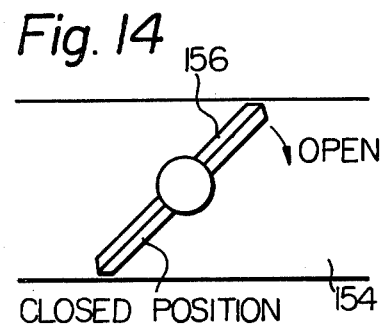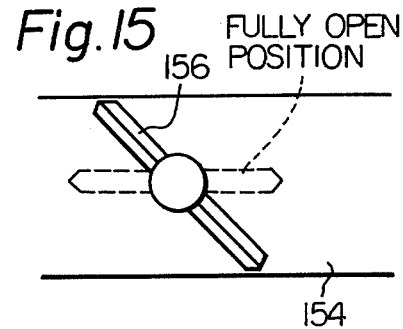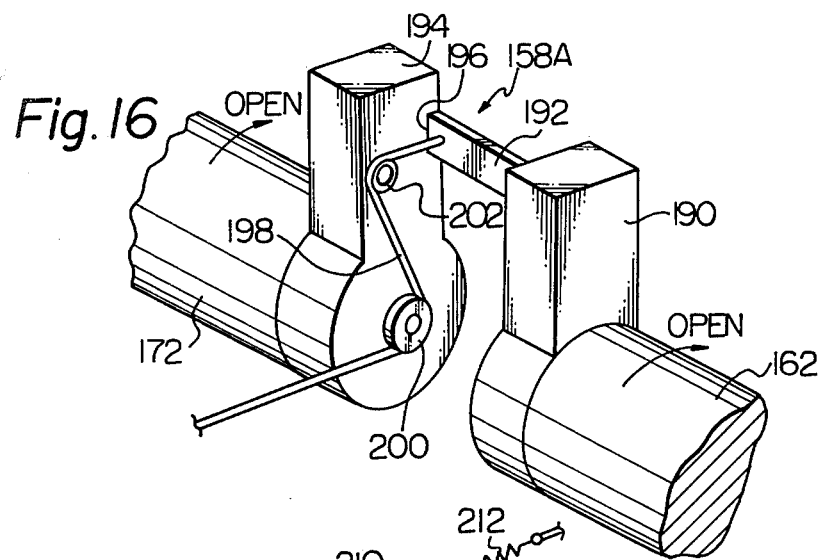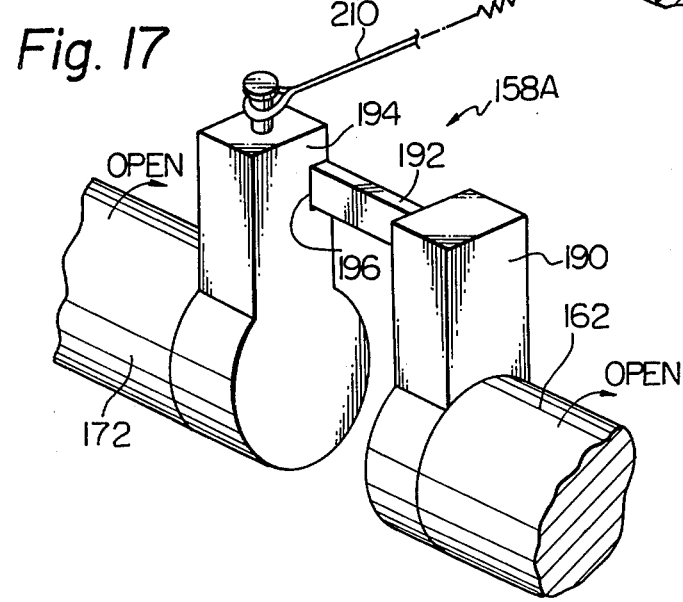

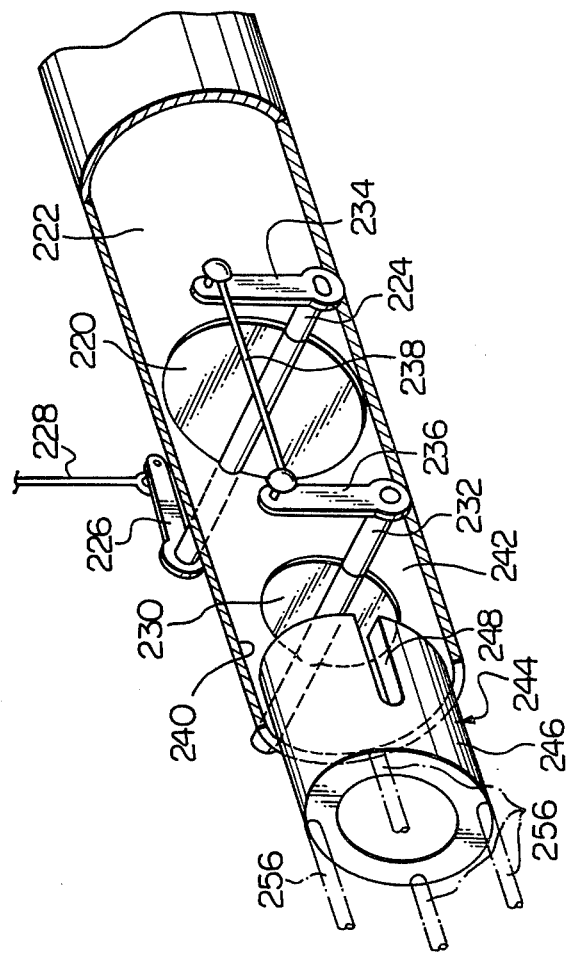

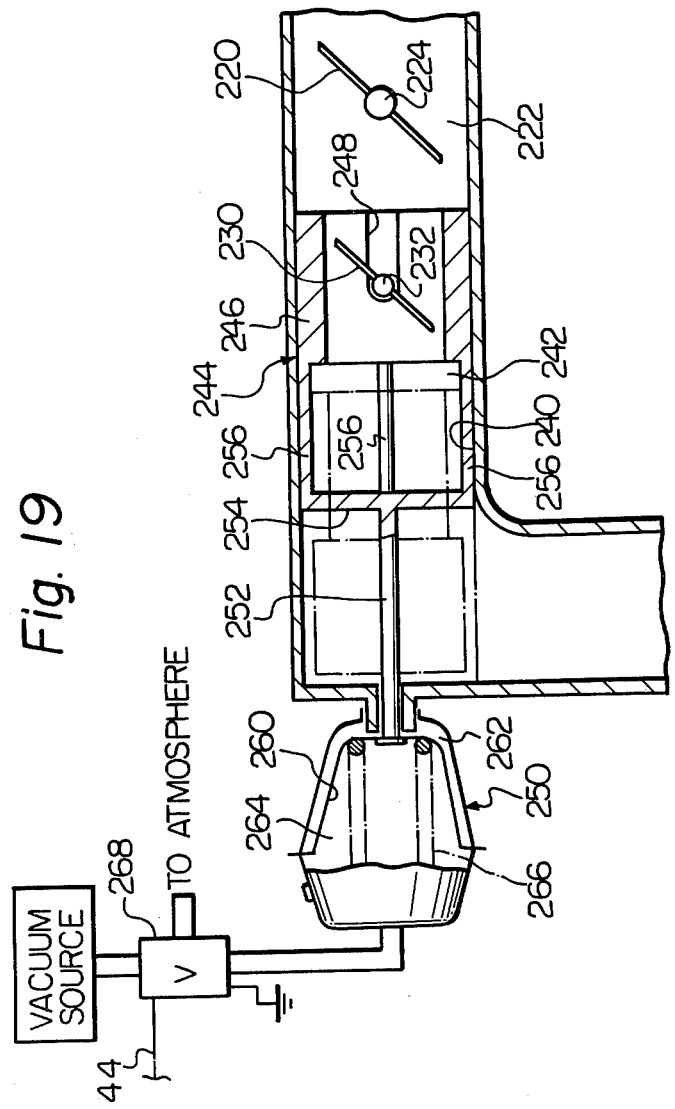

I. C. ENGINE OPERABLE IN PART-CYLINDER MODE

BACKGROUND OF THE INVENTION

The present invention relates to an intake air control system to vary the amount of air entering the cylinders of a fuel-injection multi-cylinder internal combustion engine equipped with a cylinder selector when the engine is switched from full-cylinder mode to part-cylinder mode or vice versa in order to maintain the previous level of power output of the engine after the switching.

The power output of the conventional spark-ignited fuel-injection multi-cylinder internal combustion engine is controlled by a throttle valve. At low power output under light load, the throttle valve is nearly closed to restrict the amount of air entering the cylinders. This gives rise to "throttling loss" caused by the engine's expenditure of energy in drawing its air into its cylinders against a high vacuum in the intake manifold (caused by pressure drop across the throttle valve). Because of this, an engine runs most efficiently when unthrottled, i.e., under heavy load. Thus, operating an engine at the unthrottled state will be one of effective ways to cut fuel consumption.

The conventional automotive engine is designed so that it can afford to produce adequate power for the car's demands estimated assuming a wide range of running conditions, and it is not rare to operate an engine at between ⅛ and ¼ of its rated maximum power output when the car travels at its cruising speed.

It has been proposed that fuel consumption within a light load operating range, can be cut by operating only the reduced number of cylinders at high-per-cylinder output by increasing load-per-cylinder to produce adequate power for the car's demands, by cutting off fuel supply to the remaining cylinders.

The known spark-ignited, fuel-injection automotive internal combustion engines equipped with a cylinder selector system, in which fuel supply to predetermined cylinders is cut off and only air supply to these cylinder continues, have a shortcoming that a reduction in the power by the engine and discontinuity have been experienced upon switching from full-cylinder mode to part-cylinder mode if an operator maintains the same depression degree of an accelerator pedal. Thus, it was necessary to manipulate an accelerator pedal to supply additional amount of air to the cylinders by increasing the opening degree of a throttle valve to increase power-per-cylinder output of the selected cylinders to which fuel injection continues to produce adequate power for the car's demands.

SUMMARY OF THE INVENTION

It is a main object of the present invention to provide an intake air control system of an internal combustion engine having a plurality of cylinders supplied by separate fuel injectors and means for supplying fuel to selected ones of the plurality of cylinders in a part-cylinder mode operation.

It is further object of the present invention to provide such an intake air control system as above which is reliable, in operation during its life expectancy.

It is still further object of the present invention to provide such an intake air control system as above which includes means for increasing the throttle opening position of a throttle blade in part-cylinder mode operation of the engine.

It is still further object of the present invention to provide an intake air control system which includes a second induction passage bypassing a first throttle blade in a first induction passage, a second throttle blade in the second induction passage, and a clutch which selectively establishes coactive relative relation between the first and second throttle blade.

It is still further object of the present invention to provide an intake air control system which includes in an induction passage a second small throttle blade upstream of a first large throttle blade, and a slide valve for selectively closing an annular clearance around the small throttle blade.

BRIEF DESCRIPTION OF THE ACCOMPANYING DRAWINGS

FIGS. 3A and 3B show a timing diagram explaining the operation of the circuit shown in FIG. 1;

FIG. 4 is a perspective diagram showing an arrangement of an intake air control system of the engine according to the present invention(first embodiment);

FIG. 5 is an enlarged view of a portion of FIG. 4;

FIG. 6 is a similar view to FIG. 5 showing a different position of parts;

FIG. 7 is an exploded view of a throttle shaft, a free lever and a throttle control lever;

FIG. 8 is a graph showing air flow characteristics given by the intake air control system;

FIG. 9 is a similar view to FIG. 5 showing a portion of a second embodiment;

FIG. 10 is a similar view to FIG. 10 showing a different position of parts;

FIGS. 14 and 15 are views explaining positions of a second throttle blade shown in FIG. 12;

FIG. 16 is a perspective view of a portion of a fourth embodiment showing another example of a clutch;

FIG. 17 is similar view to FIG. 16 showing still another example of a clutch (fifth embodiment);

FIG. 18 is a perspective, partly broken away, view of a sixth embodiment;

FIG. 19 is a longitudinal sectional view of FIG. 18;

DESCRIPTION OF THE PREFERRED EMBODIMENTS

Figure 1:
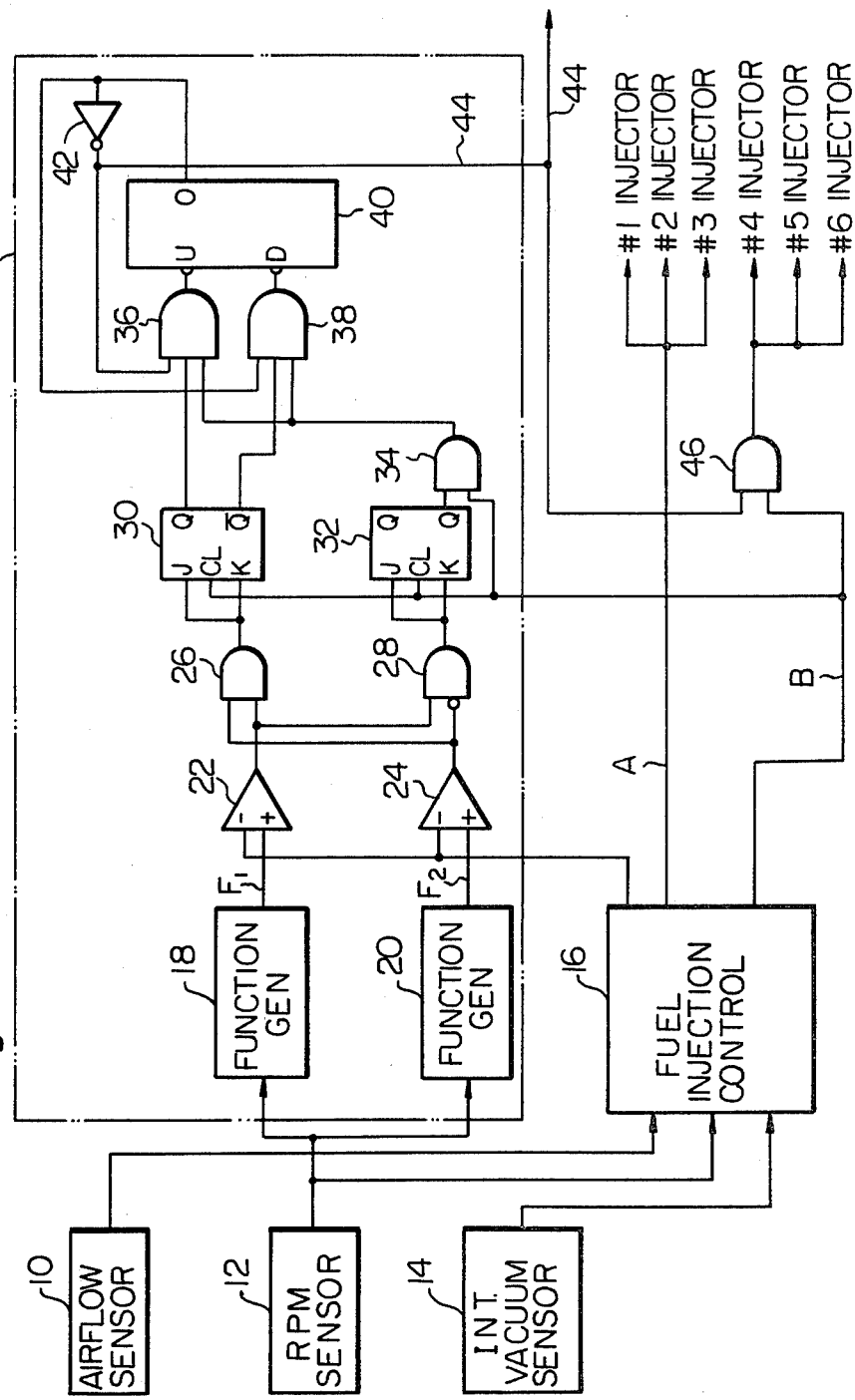
FIG. 1 is a block diagram of a fuel injection control circuit of a fuel-injection multi-cylinder internal combustion engine.

Referring to FIGS. 1 and 4, FIG. 1 shows a circuit diagram of a fuel injection system for a six cylinder internal combustion engine incorporating a cylinder selector, while, FIG. 4 shows a schematic diagram of a first preferred embodiment of an air flow controller of the invention which increases air supply to the engine cylinders in response to a signal from the cylinder selector representing 3-cylinder mode such that with the same depression degree or position of an accelerator pedal, air supply to the cylinders will increase when 3-cylinder mode is selected as compared to that when full-cylinder or 6-cylinder mode is selected.

Although not shown in the accompanying drawings, an internal combustion engine to which the system shown in FIG. 1 and the flow controller shown in FIG. 4 are applicable comprises six cylinders, each provided with an inlet valve and an outlet or exhaust valve which will be kept activated even if fuel injection from the corresponding fuel injector is suspended when the engine runs on three cylinders.

Referring now to FIG. 1, an air flow sensor 10 is provided to detect flow of intake air entering all of the cylinders of the engine to produce, as an output, a signal representing the detected air-flow volume per unit revolution of the engine cranckshaft. A RPM sensor 12 produces, as an output, a signal representing the engine revolution per minute(RPM). An intake vacuum sensor 14 detects the intake manifold depression or vacuum to produce, as an output, a signal representing the magnitude of the detected intake manifold depression.

An electronic fuel injection control unit 16 detects in response to the outputs from the sensors 10, 12 and 14 the mangitude of the engine load and produced a pulse signal whose width represents the detected engine load. A voltage signal representing the detected engine load is also produced by the fuel injection control unit 16.

Figure 2:
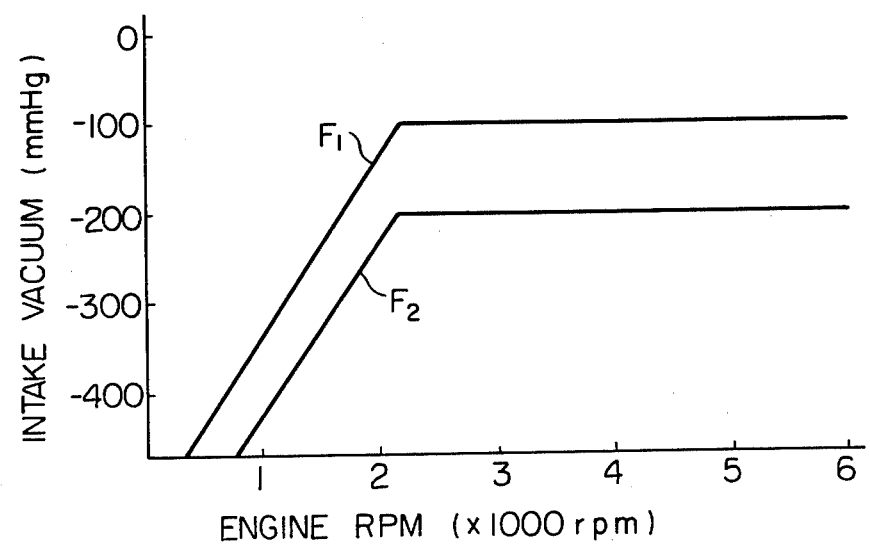
FIG. 2 is a graph showing outputs from function generators shown in FIG. 1.
Figure 11:
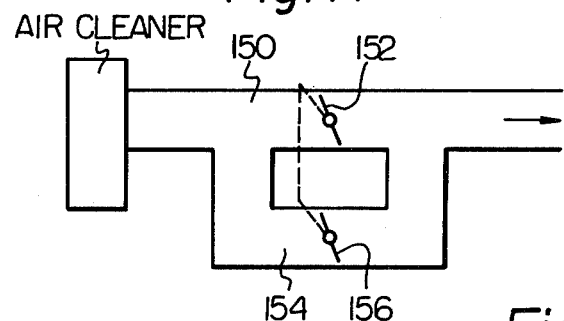
FIG. 11 is a schematic diagram showing a third embodiment.
Figure 12:
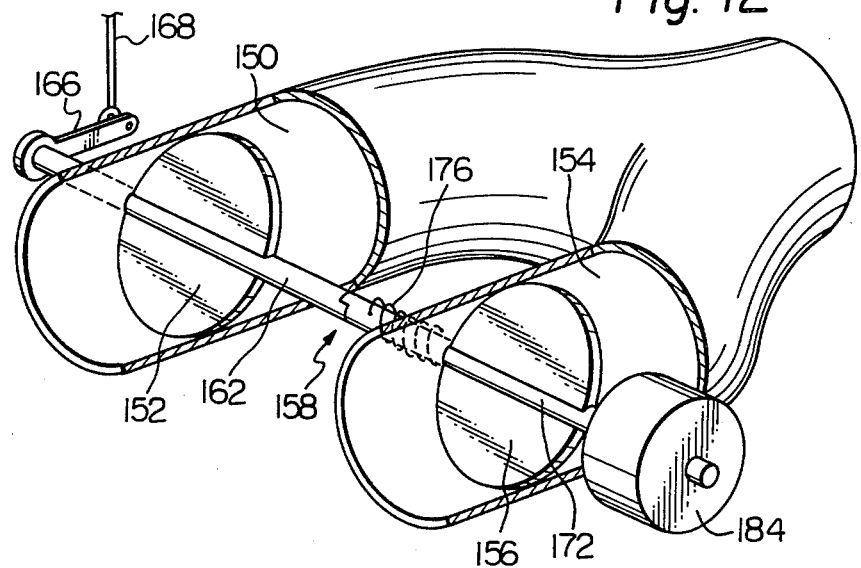
FIG. 12 is a perspective view, partly in section, of a portion of the third embodiment.

The output from the RPM sensor 12 is applied to function generators 18 and 20. The function generator 18 is designed to provide an output whose amplitude has a characteristic change as a function of the input signal. As indicated by a curve $F_1$ of FIG. 2, the output from the function generator 18 increases linearly as the engine RPM increases and levels off when the engine RPM reaches approximately 2,000 RPM. The output from the function generator 18 corresponds to the engine load so that it represents a variable reference level with which the voltage signal, supplied by the fuel injection control unit 16, representing the detected engine load is compared. Therefore, the engine load is compared with a lower reference level until 2,000 RPM is reached than when the engine RPM exceeds that speed level. The function generator 20 is designed to provide an output characteristic curve as indicated by curve $F_2$, which is similar to the curve $F_1$ except that the level of the output is lower than the curve $F_1$.

The outputs from the function generators 18 and 20 are connected to the noninverting of comparators 22 and 24, respectively, for comparison with the sensed engine load. Comparator 22 provides a high voltage level output when the engine load is lower than the reference setting level determined by the function generator 18 and a low voltage level output when the situation is reversed. Similarly, comparator 24 provides a high voltage level output when the engine load is lower than the reference setting level determined by the function generator 20 and a low voltage level output when the situation is reversed.

The outputs from the comparators 22 and 24 are both at the high voltage level or "1" logic state when the engine load as represented by intake vacuum is lower than the setting level determined by the curve $F_2$ of function generator 20 and both at the low voltage level or "0" logic state when the engine load is higher than the setting level determined by the curve $F_1$ of function generator 18.

When the engine load lies between the levels set by function generators 18 and 20, comparator 22 output is "1" while comparator 24 output is "0" so that AND gate 28 is activated.

The engine is assumed to have been started at time $t_0$(see FIG. 3A) and the engine load is higher than the reference level $F_1$ until time $t_1$. During this time interval, comparators 22 and 24 provide "0" output so that AND gates 26 and 28 remain in the low or "0" output state(FIGS. 3Ad to 3Ag).

The outputs from the AND gates 26 and 28 are connected to the J and K input terminals of flip-flops 30 and 32, respectively. Flip-flops 30 and 32 are both synchronized with a pulse signal supplied to their clock terminals CL from the electronic fuel injection control unit 16. This signal is used as a fuel injection signal for the fuel injectors #4,#5 and #6 so that they are activated at the same timed intervals, while the injectors #1, #2 and #3 are activated simultaneously with different timing from the injectors #4 to #6. The injection pulses supplied to the #1 to #3 injectors are termed injection signal A and those supplied to the #4 to #6 injectors are termed injection signal B and both signals are supplied from the control unit 16(FIGS. 3Ab and 3Ac).

During the time interval $t_0$ to $t_1$, flip-flops 30 and 32 remain in the same logic state and provide high voltage level $\bar{Q}$ outputs(FIGS. 3Ah and 3Ai). The $\bar{Q}$ outputs of flip-flops 30 and 32 are connected to AND gates 38 and 34, respectively. AND gate 34, when enabled by the $\bar{Q}$ output from the flip-flop 32, passes the clock signal to AND gates 36 and 38, and thence to the up- and down-count terminals of an up-down or forward-backward counter 40, respectively. The output of the counter 40 is coupled to the AND gate 38 and the inverted output of the counter 40 by means of an inverter 42 is coupled to the AND gate 36 and also over lead 44 to an AND gate 46 to which is also applied the injection pulse signal B. The output from the AND gate 46 is connected to the #4, #5 and #6 injectors.

With the $\bar{Q}$ output of flip-flop 32 being at the "1" logic state, AND gate 34 is enabled to pass the clock pulses to AND gates 36 and 38. During this initial time period $t_0$ to $t_1$, the output from the forward-backward counter 40 is still in the "0" logic level and thus AND gates 36 and 38 are in the "0" logic state and AND gate 46 is enabled so that all the injectors are supplied with injection control signals. Therefore, it should be understood that when the engine load is above the higher setting level $F_1$ during the initial starting period i.e. when the engine is operating under heavy load condition with its crankshaft revolution relatively low, all the cylinders of the engine are brought into full operation to give maximum output power.

When the engine load falls below the setting level $F_1$, but lies above the lower setting level $F_2$ at time $t_1$, comparator 22 is switched to the high output state while comparator 24 remains in its low output state, resulting in the AND gate 28 providing a "1" output. With AND gate 28 being switched to "1" clock pulse B1(FIG. 3Ac) that occurs immediately after time $t_1$ causes flip-flop 32 to change the binary state of its Q output to "0", disabling AND gate 34.

At time $t_2$ the engine load falls below the lower setting level $F_2$ and consequently comparator 28 is switched to the high output state. The output of AND gate 26 goes high and that of AND gate 28 goes low. Clock pulse B2(FIG. 3Ac) that occurs immediately after time $t_2$ changes the binary state of flip-flops 30 and 32. AND gates 34 and 36 are thus enabled and clock pulse B3 which occurs subsequent to pulse B2 is applied to the up-count input of counter 40 with the result that the output thereof goes high at time $t_3$. With the counter output being at the "1" logic state, AND gate 35 is disabled to prevent the application of subsequent clock pulses to the up-count input, and the AND gate 46 is disabled. Therefore, during the time interval $t_1$ to $t_3$ the 6-cylinder mode is maintained.

From time $t_2$ onward the engine runs under light load condition with its crankshaft revolution relatively high, #4, #4 and #6 injectors are disabled and the vehicle runs on 3 cylinders(3-cylinder mode).

It is assumed that the vehicle speed has decelerated after time $t_3$ and accelerated again at time $t_4$ so that the vehicle speed or RPM is relatively low in comparison with the engine load. With the engine load exceeding the lower setting level $F_2$ at time $t_4$, the comparator 24 output goes low and AND gate 28 provides "1" output. Clock pulse B4 occurring after time $t_4$ switches the flip-flop 32 so that its $\overline{Q}$ output goes low. As a result AND gate 34 is disabled.

At time $t_5$ the engine load exceed the higher setting lever $F_1$ to enable the comparator 22 to be switched to the low output state and AND gates 26 and 28 are also switched to the "0" logic state. Clock pulse B5 subsequent to time $t_5$ switches the fli-flops 30 and 32 so that their $\overline{Q}$ outputs assume a high voltage level, causing AND gate 34 to be enabled. Since the output state of the counter 40 is in the "1" logic state, AND gate 38 is also enabled and a subsequent clock pulse B6 is applied to the down-count input of the counter 40, so that the output of the counter 40 changes to the "0" state at time $t_6$. This enables AND gate 46 so that the engine's operational mode is again switched to the 6-cylinder mode at time $t_6$, in response to the subsequent injection pulse B7.

During time interval $t_6$ to $t_7$, engine load is above the higher setting level $F_1$ and during interval $t_7$ to $t_8$ it lies between the high and low setting levels as during the interval $t_1$ to $t_2$. The engine runs on six cylinders until time $t_9$. As the engine runs at low city traffic speeds the outputs from the function generators 18 and 20 gradually decrease as illustrated in FIG. 3Aa, and if the engine load is assumed to decrease below the decreasing lower threshold level $F_2$ as illustrated, the #4, #5 and #6 injectors are disabled at time $t_9$ and the engine runs on 3 cylinders from then on.

Flip-flops 30 and 32 are designed to change their binary state in response to the trailing edge of the injection pulse. This guarantees against the generation of injection pulses having different pulse duration from that determined by the electronic fuel injection control unit 16.

Referring to FIGS. 4 to 7, a mechanical system is illustrated diagrammatically which, with the same depression degree of an accelerator pedal, opens a throttle valve or blade wider, in response to a signal on the line 44 from the cylinder selector when the engine is switched from 6-cylinder mode to 3-cylinder mode, by changing a dynamic point on a throttle valve angular position control lever from a remote location to a less remote location from the axis of rotation of the lever.

In FIG. 4, the reference numeral 50 denotes an intake passage having one end communicable with all of the cylinders of the engine through an intake manifold, although not shown, in the conventional manner. A throttle blade 52 is disposed in the intake passage 50 for controllably passing air flow therethrough and mounted to a throttle shaft 54 for rotation as a unit. The throttle shaft 54 is rotatable about an axis and a throttle control lever 56 has one end connected to the throttle shaft 54 for rotation as a unit about the axis. The throttle valve 52 is rotatable about the axis between a closed position in which effective flow area of the intake passage 50 is minimum and a fully open position in which effective flow area of the intake passage 50 is maximum. Although not shown, a spring is provided to bias the throttle blade 52 in one rotational direction toward the closed position, in the conventional manner.

A free lever 58 has one end rotatably mounted to the throttle shaft 54 for rotation about the axis and an accelerator link rod 60 has one end pivotally connected to an opposite end of the free lever 58. The accelerator link rod 60 has an opposite end thereof pivotally connected to a lever 62 fixedly attached to one end of a rotatable shaft 64 which is operatively connected, via a lever 66, a link 68, a bell crank lever 70, and a link 72, to an accelerator pedal 74 so that depressing the accelerator pedal 74 will cause downward, viewing in FIG. 4, movement of the accelerator link rod 60.

As best shown in FIG. 7, the throttle shaft 54 is formed with a reduced diameter rod section 76 extending axially from a leading end thereof, with a tongue section 78 extending outwardly from the reduced diameter rod section 76, and with a thinner tongue section 80 extending outwardly from the tongue section 78. The free lever 58 is formed with a circular aperture 82 for rotatably receiving the reduced diameter rod section 76, while, the throttle control lever 56 is formed with a retangular aperture 84 for receiving the tongue section 78, so that the free lever 58 is rotatably mounted to the throttle shaft 54 and the throttle control shaft 56 is fixedly mounted to the throttle shaft 54 for rotation therewith.

The free lever 58 is formed at a leading end thereof a laterally extending finger 86, while, the throttle control lever 56 is formed at a remote portion from the axis of rotation thereof with a recess 88 adapted to receive the finger 86, in order to transmit rotational movement of the free lever 58 in a counterclockwise direction only, viewing in FIGS. 4 and 6, to the remote portion of the control lever 56 against the biasing action of the spring, not shown, which biases the throttle valve and thus the throttle shaft 52 in a valve closed direction.

A change-over 90 has one end pivotally connected to the throttle control lever 56 at a leading end thereof so as to be rotatable, with respect to the throttle control lever 56, between an operative position as illustrated in FIG. 6, in which the change-over lever 90 and the throttle control lever 56 will rotate as a unit about the axis and an inoperative position as illustrated in FIG. 5 in which the change-over lever 90 is free from the rotation as a unit with the throttle control lever 56. The change-over 90 has an opposite end formed with a cutout 92 which will come into abutting contact with the thin tongue section 80 to define the FIG. 6 operative position after clockwise rotation of the change-over lever 90 from FIG. 5 inoperative position to FIG. 6 operative position. A sub-link 94 has one end pivotally connected to the accelerator link rod 60 at an intermediate location thereof and an opposite end pivotally connected to the change-over lever at an intermediate location designated at 96. This intermediate location 96 is chosen such that, when in FIG. 6 operative position, the distance between the intermediate location 96 and the rotation axis of the throttle shaft 54 is shorter than the distance between the remote portion, where the recess 88 is formed, of the throttle control lever 56 and the rotation axis of the throttle shaft 54. Rotational movement of the change-over lever 56 from FIG. 5 inoperative position to FIG. 6 operative position is effected through a link rod 98 having one end pivotally connected to the change-over lever 90 at an area adjacent the cutout 92 and an opposite end pivotally connected to an actuating rod 100 of a vacuum motor 102 (see FIG. 4). Preferably, the link rod 98 is arranged to extend in a radial direction from the rotation axis of the throttle shaft 54 as shown in FIGS. 5 and 6.

The vacuum motor 102 comprises a power element in the form of a diaphragm 104 to which the actuator rod 100 is fixed. The diaphragm 104 has an upper side exposed to a vacuum chamber 106 and a lower side to an atmosphere chamber 108. The actuator rod 100 is fixed to the diaphragm 104. A solenoid operated selector valve 110 is disposed between a source of vacuum 112 and the vacuum chamber 106 so as to selectively apply and release vacuum to and from the vacuum chamber 106, in a known manner, in response to a signal from the cylinder selector. When 6-cylinder mode is selected, the vacuum chamber 106 is connected to the atmosphere so that the actuator rod 100 takes a projected position so as to permit the change-over lever 90 to take the inoperative position as shown in FIGS. 4 and 5, while, when the engine has been switched from 6-cylinder mode to 3-cylinder mode, the vacuum from the source of vacuum 112 is applied to the vacuum chamber 106, deflecting the diaphragm 104 toward the vacuum chamber 106 to pull the actuator rod 100 and thus the link rod 98 upwardly, viewing in FIG. 4, until the cutout 92 abuts the thinner tongue 80 as illustrated in FIG. 6.

Although not shown, removable of the throttle control lever 56 and the free lever 58 from the throttle shaft 54 are prevented.

The system shown in FIGS. 4 to 7 operates as follows:

Under 6-cylinder mode, the pressure in the vacuum chamber 106 is at atmospheric level and the actuator rod 100 and thus the link rod 98 permits the change-over lever 90 to take the inoperative position as shown in FIGS. 4 and 5, so that depression of the accelerator pedal from FIG. 4 position will cause the free lever 58 and thus throttle control lever 56 to rotate, as a unit, counterclockwise against the biasing action of the spring to open the throttle valve 52.

Upon switching from 6-cylinder mode to 3-cylinder mode, the selector valve 110 cuts air flow communication between the vacuum chamber 106 and the atmosphere and establishes air flow communication between the vacuum chamber 106 and the source of vacuum 112 in response to a signal on the line 44 (see FIG. 1) from the cylinder selector, depressing the pressure in the vacuum chamber 106 so as to cause the diaphragm 104 to move the actuator rod 100 and thus the link rod 98 upwardly toward the operative position of the change-over lever 90 as illustrated in FIG. 6.

This upward movement of the actuator rod 100 will cause the change-over lever 90 to rotate counterclockwise about the pivot 96 from FIG. 5 position to FIG. 6 position until the cutout 92 engages the thin projection 80. This counterclockwise rotation of the change-over lever 90 will cause the throttle control lever 56 to disengage from the finger 86 to rotate counterclockwise so as to increase the opening degree of the throttle valve 52.

It will now be understood that, with the same depression degree of the accelerator pedal 74, the quantity of intake air will increase when the engine has been switched from 6-cylinder mode to 3-cylinder mode to meet the demand in 3-cylinder mode operation of the engine.

As shown in FIG. 8, an amount of opening degree of the throttle valve 52 as the accelerator pedal 74 is depressed by a predetermined degree will increase when the engine is switched from 6-cylinder mode to 3-cylinder mode. This is because, under 3-cylinder mode, longitudinal movement of the accelerator link rod 60 will be transmitted to the throttle control lever 56 at a less remote portion thereof from the rotation axis than a remote portion where the recess 88 is formed (see FIG. 6).

Upon switching back from 3-cylinder mode to 6-cylinder mode, the selector valve 110 cuts air flow communication between the vacuum chamber 106 and the source of vacuum 112 and establishes air flow communication between the vacuum chamber 106 and the atmosphere, allowing the actuator rod 100 and the link rod 98 to extend to such an extent that the change-over lever 90 rotates clockwise about the pivot 96 from FIG. 6 position to FIG. 5 position under the biasing action of the throttle return spring. This clockwise rotation of the change-over lever 90 will cause the throttle control lever 56 to rotate clockwise from FIG. 6 position to FIG. 5 position until the recess 88 is engaged by the finger 86, thus decreasing the opening degree of the throttle valve 52.

In the first preferred embodiment described in connection with FIGS. 1 to 8, a motion of a lever 62 (see FIG. 4) is transmitted to a remote portion of a throttle control lever 56 via an accelerator link rod 60 and a free lever 58 formed with a finger 86 engageable in a recess disposed in the remote portion of the throttle control lever 56 or the motion is transmitted to a less remote portion of the throttle control lever 56 via sub link rod 94 and a change-over lever 90 as the change-over lever is in an operative position thereof as illustrated in FIG. 6.

In a second preferred embodiment which will now be described in connection with FIGS. 9 and 10, a motion of a lever 62 is transmitted to a remote portion of a throttle control lever 56 via one element 120 of a lost motion connection means 122 and the other element 124 thereof as these elements take a contracted operative position as shown in FIG. 9 or the motion is transmitted to a less remote portion of the throttle control lever 56 via one element 126 of a second lost mostion connection means 128 and the other element 130 thereof as the elements of the lost mostion connection means 128 take an extended operative position as shown in FIG. 10.

Referring to the first lost motion connection means 122, the element 120 has a cylindrical section 120a formed with a blind bore, while, the other element 124 has a piston 124a slidably received in the blind bore of the cylindrical section 120a, so that these elements are telescopically extendable from and contractable toward a contracted operative position shown in FIG. 9 in which a positive motion connection is established and a motion of a lever 62 (ref. FIG. 4) is transmitted to the remote portion of the control lever 56 where the element 124 is pivotally connected.

Referring to the second lost motion connection means 128, the element 126 has a rod section 126a pivotally connected at one end thereof to the element 120 of the first lost motion connection means 122 and a ring section 126b fixedly attached to the opposite end of the rod section 126a, while, the other element 130 has a rod section 130a pivotally connected at one end thereof to the less remote portion of the control lever 56 and a ring section 130b fixedly attached to the rod section 130a. Through the ring section 126b the rod section 130a slidably extends, while, through the ring section 130b the rod section 126a slidably extends so that the elements 126 and 130 are telescopically retractable from and extendable toward an extended operative position as shown in FIG. 10. The rings 126b and 130b abut with each other to define the extended operative position of the second lost motion connection means 128.

A control wire 132 has one end fixedly attached to the ring 126b and passes around a pulley mounted to the other ring 130b, a pulley 136 mounted to the control lever 56 at a location between the remote and less remote portions thereof and a pulley 138 mounted to an axial end of a throttle shaft 54 coaxially. The opposite end of the wire 132 is fixed to an actuator rod 100 (ref. FIG. 4).

Under 6-cylinder mode, the control wire 132 is permitted to extend enough to allow the throttle return spring to bias the throttle lever 56 and thus the piston section 124a of the element into abutting engagement with the bottom of the blind bore of the cylinder section 120a of the element 120, as shown in FIG. 9. In FIG. 9 position, the elements 126 and 130 are telescopically movable with each other to provide a lost mostion connection. Thus, under this condition, motion of the accelerator pedal 74 is transmitted to the throttle control lever 56 via the first lost motion connection means 122.

When switching from 6-cylinder mode to 3-cylinder mode, the wire 132 is pulled so as to pull the element 126 upwardly until its ring section 126b abuts the ring section 130b of the other element 130, as shown in FIG. 10. During this movement, the throttle control lever 56 is rotated counterclockwise from FIG. 9 position to FIG. 10 position, increasing the throttle valve opening degree, and the elements 120 and 124 of the first lost motion connection means 122 will extend from its retracted operative position.

Under 3-cylinder mode, motion of the accelerator is transmitted through the second lost motion connection means 128 to the less remote portion of the throttle control lever from the axis of rotation thereof, so that the characteristic as shown in FIG. 8 is obtained. The reason why the wire 132 passes through an area around the axis of rotation of the throttle shaft 54 is that there occurs no moment upon pulling the wire 132.

Referring to a third embodiment shown in FIGS. 11 to 15, in addition to a first intake passage 150 having therein a first throttle valve 152 for controllably passing air flow therethrough, a second intake passage 154 is provided which bypasses the throttle valve 152. The second intake passage has therein a second throttle valve 156 and a clutch 158 is provided which has a driving element 160 formed on a throttle shaft 162 of the first valve 152 at the opposite axial end 164 thereof to an axial end to which a throttle control lever 166 is fixedly connected. The throttle control lever 166 is operatively connected with an accelerator pedal, not shown, through an accelerator link rod 168 to be rotated as the accelerator pedal is manipulated. A driven element 170 of the clutch 158 is formed on a second throttle shaft 172 of the second throttle valve 156 at the adjacent end 174 thereof to the end 164 of the first throttle shaft 162. A spring 176 is arranged to encircle the second throttle shaft 172 and has its opposite end engaging the second throttle shaft 172 and means defining the second intake passage 154 to bias the second throttle shaft 172 and the second throttle valve 156 toward a closed position thereof, this position being illustrated in FIG. 12. Although not shown, a throttle valve return spring is provided to bias the first throttle shaft 162 and the first throttle valve 152 toward a closed position thereof, this position being illustrated in FIG. 12.

Figure 13:
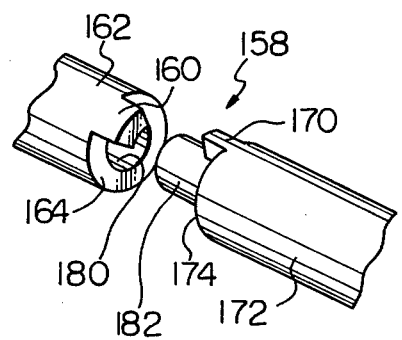
FIG. 13 is an exploded view of a clutch shown in FIG. 12.

As shown in FIG. 13, the first throttle shaft 162 is formed with an axial blind bore 182 for rotatably receiving a reduced diameter projection 182 of the second throttle shaft 172. The driven element 170 is forced toward the driving element 160 by the spring 176 to effect an engagement of the clutch 158. When the clutch 158 is engaged, the second throttle valve 156 is rotated between a closed position thereof, such as shown in FIG. 14, and a fully open position thereof, such as shown by broken lines in FIG. 15, as the accelerator pedal is manipulated to rotate the first throttle shaft 162 and thus the first throttle valve 152 between the closed position thereof and a fully open position thereof. An actuator 184 for operating the clutch 158 is provided. When a signal on the leading line 44 (see FIG. 4) switches from one representing 3-cylinder mode to the other representing 6-cylinder mode signal, the actuator 184 rotates swiftly the second throttle shaft 172 and thus the second throttle valve 156 clockwise, viewing in FIG. 12, toward a second closed position as shown by solid line in FIG. 15 to effect a disengagement of the clutch 158. The actuator 158 may be constructed from a motor or a rotary solenoid actuator circuited with the lead line 44 (see FIG. 14) via a suitable circuit, or it may be constructed from a vacuum motor with a solenoid selector valve which converts an electrical signal to a vacuum signal.

In this embodiment, an angle through which the second throttle shaft 172 and thus the second throttle valve 156 will rotate clockwise from the position illustrated in FIG. 14 to the position illustrated by solid line in FIG. 15 is about 160 degrees. Such angle, however, may differ depending upon the dimension of the second intake passage 154 and the second throttle valve 156.

Under 6-cylinder mode, the actuator 184 urges against the biasing action of the spring 176 the second throttle shaft 172 and thus the second throttle valve 156 toward the position illustrated by the solid line in FIG. 15 so that the clutch 158 is disengaged and flow of air through the second intake passage 154 is prevented regardless of the manipulation of the accelerator pedal to open and close the first throttle valve 152. Therefore, under this condition, intake air to be fed to the cylinders of the engine is controllably past through the first intake passage 150 by the first throttle valve 152, because the second intake passage 154 is closed.

Under 3-cylinder mode, the actuator 184 permits the spring 176 to force the second throttle shaft 172 and thus the driven element 170 into engagement with the driving element 160 of the first throttle shaft 162 to effect engagement of the clutch 158 so that the second throttle valve 156 will be rotated between the FIG. 14 position and the position illustrated by the broken lines in FIG. 15 in response to rotation of the first throttle valve 152. Under this condition, intake air is supplied to the cylinders of the engine through the second intake passage 154 also, thus increasing the total of intake air supplied to each cylinder.

The clutch 158 and the actuator 184 for operating the same may be replaced with an arrangement shown in FIG. 16 or 17.

Referring to FIG. 16, a clutch 158A is shown in which a first arm 190 having an engaging bar 192 at its leading end constitutes a driving element of the clutch, while, a second arm 194 formed with a groove 196 for receiving the engaging bar 192 constitutes a driven element of the clutch. Although not shown, throttle shafts 162 and 172 are biased toward closed position of their respective throttle valves, not shown, by means of throttle return springs, not shown, respectively. A wire 198 interconnects the driving element at the engaging bar 192 and an actuator, not shown, and passes around a pulley 200 mounted to the arm 194 adjacent the axis of rotation of the arm 194 and the throttle shaft 172 and another pulley 202 mounted to the arm 194 also. When the clutch 158A is in an engaged condition, as shown in FIG. 16, the actuator pulls the wire 198 to such an extent that the wire 198 is fully strained to urge the engaging bar 192 into engagement with the groove 196. The arrangement of the pulley 200 is determined so as not to cause the wire 198, when in its fully strained condition, to apply any moment upon the arm 194 and the throttle shaft 172 as they rotate. A disengagement of the clutch 158A is carried out by causing the actuator to extend the wire 198 to such an extent as to permit rotation of the arm 190 and the throttle shaft 162 relative to the arm 194 and the throttle shaft 172. Under this condition, the arm 194 and the throttle shaft 172 take the closed position of its throttle valve under the biasing action of its return spring. As the actuator, a vacuum motor such as shown at 102 in FIG. 4 may be employed. In this case, the wire 198 is connected to the actuator rod 100 (see FIG. 4, also).

Preferably, the return spring, which biases the throttle shaft 172 toward the closed position of its throttle valve, is chosen such that it is weak enough, as compared to the return spring for the throttle shaft 162, so as to permit rotation of the throttle shaft 172 and the arm 194, as the wire 198 is pulled toward its fully strained condition, until the groove 196 of the arm 194 is engaged by the engaging bar 192 without moving the arm 190 and the throttle shaft 162 toward the closed position of its throttle valve.

It is to be understood in this embodiment that, as different from the previously described embodiment in connection with FIGS. 11 to 15, the driving and driven elements of the clutch 158A are arranged such that the return spring for the throttle shaft 172 biases the driven element away from the driving element to effect a disengagement of the clutch 158A.

The cable 198 and the pulleys 200 and 202 shown in FIG. 16 embodiment may be replaced with a yieldable means, as shown in FIG. 17, including a wire 210 having one end fixed to an arm 194 and a spring 212 having one end connected to the opposite end of the wire 210 and an opposite end thereof connected to an actuator, such as an actuator rod 100 (see FIG. 4).

Referring to FIG. 17, a fully strained condition of the wire 210 is shown in which a clutch 158A is engaged. Under this condition, the spring 212 forces an arm 194 and an engaging bar 192 toward each other to effect the engagement of the clutch 158A. The spring 212 is chosen such that it is weaker than a return spring for a throttle shaft 162 but stronger than a return spring for another throttle shaft 172.

Figure 20:
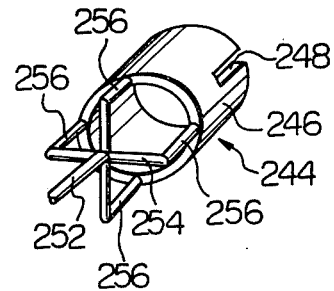
FIG. 20 is a perspective view of a valve member of a slide valve shown in FIG. 19.

Referring to FIGS. 18 to 20, an embodiment shown comprises a first relatively large throttle valve 220 disposed in an intake passage 222 and mounted to a first throttle shaft 224 for rotation as a unit. A throttle control lever 226 has one end connected to the throttle shaft 224 for rotation as a unit and an opposite end pivotably connected to one end of an accelerator link 228 which is operatively connected to an accelerator pedal, not shown, in a known manner. A second relatively small throttle valve 230 is disposed in the intake passage 222 upstream of the first throttle valve 220 and mounted to a second throttle shaft 232. The first and second throttle shafts 224 and 232 are arranged in parallel and are connected with each other through a linkage including levers 234 and 236 connected to the throttle shafts 224 and 232, respectively, and a link rod 238 so that rotation of the throttle shaft 224 in response to depression of the accelerator pedal will cause the throttle shaft 232 to rotate in a similar manner. The second throttle valve 230 is located in the central area of the intake passage 230 such that, when it is in a closed position, the throttle valve 230 is spaced from the adjacent portion of wall means 240 defining the intake passage 222 to form therebetween an annular space 242 whose effective air flow area will not be varied by the throttle valve 230. However, the annular space 242 is selectively closed by a slide valve 244.

The slide valve 244 comprises a cylindrical valve member 246 adapted to close the annular space 242 and is slidably engaging the wall means 240 to move between a closed position, illustrated by the solid line in FIG. 19 and an open position, illustrated by the line and dot in FIG. 19. As best seen in FIG. 18 or 20, the cylindrical valve member 246 is formed with two diametrically opposed cutouts 248, only one being shown, for slidably receiving the throttle shaft 242 of the throttle valve 230. The movement of the cylindrical valve member 246 is effected by an actuator in the form of a vacuum motor 250 mounted outside the intake passage 222 via a valve stem which includes a rod section 252, a spider section 254 at one end of the rod section 252 and four bridge sections 256 extending from respective arms of the spinder section 254 toward the opposite axial end of the cylindrical valve member 246 to the axial end where the cutouts 248 are formed.

Referring to the vacuum motor 250, it comprises a power element in the form of a diaphragm assembly 260 to which the rod section 252 is fixed at its one end, an atmospheric chamber 262, on one side of the diaphragm 260, communicating with the atmosphere, a vacuum chamber 262, on the opposite side of the diaphragm 260, and a spring 266 disposed within the vacuum chamber 264 to bias the diaphragm 260 toward the atmospheric chamber 262 and thus the cylindrical valve member 246 toward the closed position as illustrated in FIG. 19. The vacuum chamber 264 communicates selectively with the vacuum source or the atmosphere under the control of a solenoid actuated selector valve 268. When a signal representing 3-cylinder mode appears on the leading line 44 and applied to the solenoid selector valve 268, vacuum is applied to the vacuum chamber 266 from the vacuum source to urge the diaphragm 260 toward the vacuum chamber 264 against the biasing action of the spring 266, thus moving the cylindrical valve member 246 toward the open position, the position being illustrated by line and dot in FIG. 19. When a signal on the leading line 44 has switched to one representing 6-cylinder mode, the solenoid actuator 268 cuts air flow communication betweeen the vacuum and the vacuum chamber 264 and establishes air flow communication between the atmosphere and the vacuum chamber 264, thus permitting the spring 266 to move the cylindrical valve member 246 into the closed position.

In operation, under 6-cylinder mode, the cylindrical valve member 246 is in the closed position in which the annular space 242 is closed and rate of intake air fed to the engine through the intake passage 222 is determined by the inner diameter of the cylindrical valve member 246 and opening degree of the small throttle valve 230. The inner diameter of the cylindrical valve member 246 and the small throttle valve 230 are so dimensioned as to meet intake air demands under 6-cylinder mode operation of the engine. Under 3-cylinder mode, the cylindrical valve member 246 is in the open position in which the annular space 242 is open and the rate of intake air fed to the engine through the intake passage 222 is now determined by the diameter of the intake passage 222 adjacent the large throttle valve 220 and opening the degree of the throttle valve 220. It will be understood that, under 3-cylinder mode, the effective air flow area through the intake passage 222 is increased, as compared to that under 6-cylinder mode, with the same depression degree of the accelerator pedal. The diameter of the intake passage 222 and the large throttle valve 220 are so dimensioned as to meet inreased intake air demands under 3-cylinder mode operation of the engine.

For simplifying the operative connection between a cylindrical valve member 246 and an actuator 250, an intake passage 222 having a right angle junction is used in the embodiment shown in FIGS. 18 to 20, but the intake passage with the right angle junction may be replaced with an intake passage without such a right angle junction if a suitable connection is employed between a cylindrical valve member and an associated actuator.

Figure 21:
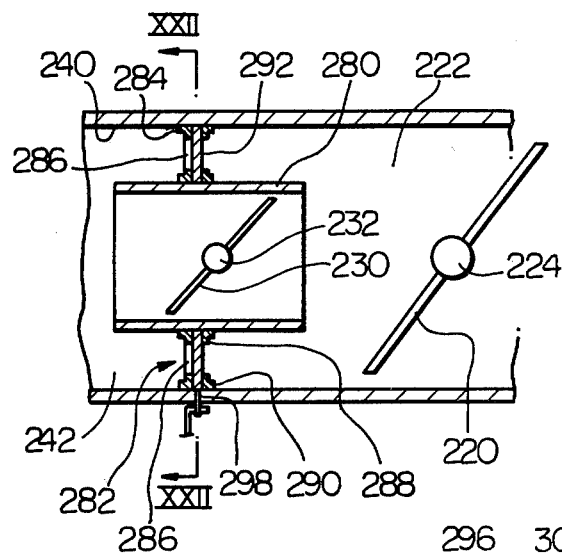
FIG. 21 is a longitudinal sectional view similar to FIG. 19 of a seventh embodiment.
Figure 22:
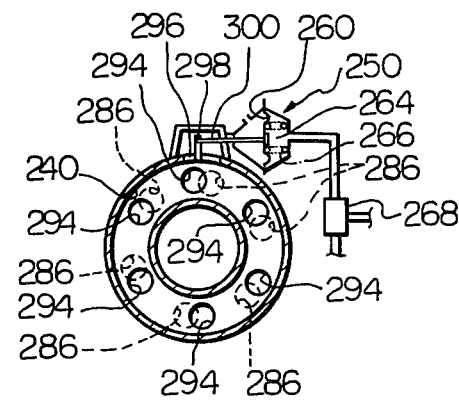
FIG. 22 is a section taken through line XXII—XXII of FIG. 21.

Although, in the embodiment shown in FIGS. 18 to 20, the inner wall of the cylindrical valve member 246 defines a valve chamber for the small throttle valve 230, as the cylindrical valve member 246 is in the closed position, in an embodiment shown in FIGS. 21 and 22, a short tube 280 coaxially arranged within an intake passage 222 defines a valve chamber for a small throttle valve 230.

Referring more particularly to the embodiment shown in FIGS. 21 and 22, it is substantially similar to the embodiment shown in FIGS. 18 to 20 except that the slide valve 244 has been replaced with a rotary valve 282. The rotary valve 282 includes a stationary annular plate 284 having an inner periphery surrounding and fixed to the outer surface of the tube 280 and an outer periphery fixed to adjacent portion of wall means 240 defining an intake passage 222. The stationary annular plate 284 divides an annular space 242 formed between the outer surface of the short tube 280 and the adjacent wall means 240 into an upstream and a downstream section, and is formed with a plurality of air flow apertures or ports 286 which when opened permits air flow communication between the upstream and downstream section of the annular space 242. Rotatably disposed between the stationary annular plate 284 and a pair of inner and outer guide rings 288 and 290 is a rotary annular plate 292 formed with a plurality, corresponding in number to the plurality of ports 286, of ports 294 (see FIG. 22) adapted to mate with the ports 286 of the stationary annular plate 284. The rotary annular plate 292 is rotatable between a closed position, as illustrated in FIG. 22, in which the ports 294 are out of alignment with the respective mating ports 286, and an open position in which the ports 294 are in alignment with the respective mating ports 286. For rotation between the closed and open position, the wall means 240 defining the intake passage 222 is formed with a guide slit 296 through which a radially projecting arm 298 of the rotary annular plate 292 extends outwardly for operative connection with an actuator rod 300 fixedly attached at one end thereof to a diaphragm 260 of a vacuum motor 250. The vacuum motor and the associated control circuit shown diagrammatically in FIG. 22 are substantially similar in construction and in operation.

In operation, under 6-cylinder more, since pressure within a vacuum chamber 264 is at atmospheric level, a spring 264 urges the rotary annular plate 292 into the closed position so that air flow through the annular space 242 is prevented.

Upon switching from 6-cylinder mode to 3-cylinder mode, vacuum is applied to the vacuum chamber 264 to urge the diaphragm 260 to the right, viewing in FIG. 22, against the biasing action of the spring 266, to rotate the rotary annular plate 292 clockwise toward the open position in which air flow through the annular space 242 is allowed.

Figure 23:
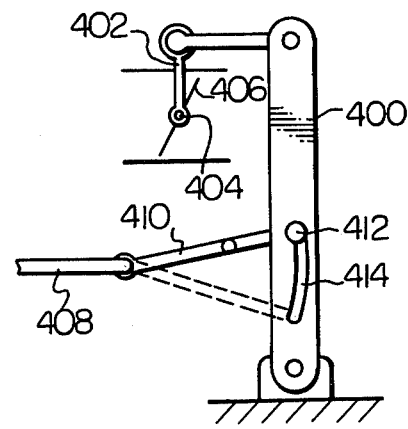
FIGS. 23 and 24 show prior art intake air control systems.

FIG. 23 is a diagrammatic illustration of a prior art which appears pertinent to the embodiments previously described in connection with FIGS. 4 to 8, and FIGS. 9 and 10. As shown, a pivoted adjusting arm 400 is pivotably connected at its leading end to an end of a throttle lever 402 whose opposite end fixedly attached an axial end of a throttle shaft 404 carrying a throttle valve 406. Swinging the adjusting arm 400 will cause the throttle valve 406 to vary its opening degree. An accelerator pedal, not shown, is operatively connected to one end of a reciprocal rod 408 whose opposite end pivotably connected to one end of a connecting rod 410. The connecting rod 410 has at the opposite end thereof has means 412 slidably received by a curved slot 414 formed through the adjusting arm 400, the slot 414 running longitudinally from a remote portion from the pivot axis of the adjusting arm 400 to a less remote portion from same. An actuator, not shown, is provided which, under 6-cylinder mode, urges the connecting rod 410 into the solid line illustrated position, while, under 3-cylinder mode, urges the connecting rod 410 into the broken line illustrated position. In operation depression of the accelerator pedal will cause the reciprocal rod 408 to move to the right, as viewed. With the same amount of movement of the reciprocal rod 408, the throttle valve 406 will be opened wider when the connecting rod 410 is in the broken line illustrated position (under 3-cylinder mode) than when the connecting rod 410 is in the solid line illustrated position (under 6-cylinder mode), as will be readily understood from FIG. 23. This prior art arrangement has a construction weakness that the slidable junction between the connecting rod 410 and the slot 414 is liable to be worn away at such a fast rate as to hamper smooth operation of the device during its expected life.

The embodiments of the present invention shown in FIGS. 4 to 8 and FIGS. 9 and 10 are free from the above mentioned shortcoming encountered in the prior art arrangement shown in FIG. 23 as will be readily appreciated from the description in connection with and illustration of FIGS. 4 to 6 and FIGS. 9 and 10.

Figure 24:
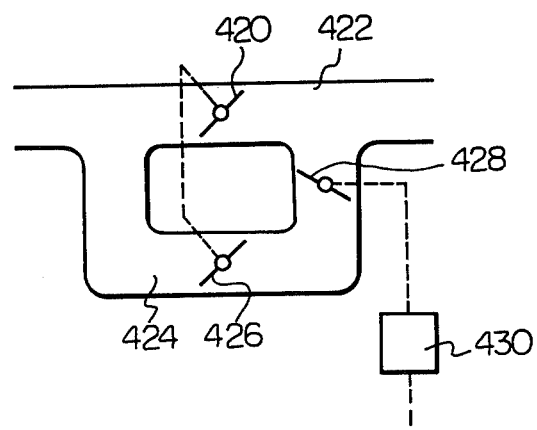

FIG. 24 is a diagrammatic illustration of another prior art which appears pertinent to the embodiments previously described in connection with FIGS. 11 to 15, FIG. 16 and FIG. 17. As shown, bypassing a main or first throttle valve 420 in a main or first intake passage 422, an auxiliary or second intake passage 242 provided with an auxiliary or second intake valve 426 is connected to the first intake passage 422. The first and second intake valves 420 and 426 are at all times cooperating with each other so that depressing an accelerator pedal, not shown, will cause respective opening movements of the both intake valve 420 and 426. In order to prevent air flow through the second intake passage 424, under 6-cylinder mode operation of the engine, a shut-off valve 428 is disposed in the second intake passage 424 operatively connected with an actuator 430. The shut-off valve 428 takes a closed position to prevent air flow through the second intake passage 424 when a signal representing 6-cylinder mode is applied to the actuator 430, and, when a signal representing 3-cylinder mode is applied to the actuator 430, the shut-off valve 428 takes a fully open position, thus permitting air flow through the second intake passage 424 under the control of the second intake passage 426. This prior art arrangement has a shortcoming that the provision of the two valves in the second intake passage will cause a bulky construction as a whole.

The embodiments of the present invention shown in FIGS. 11 to 15, FIG. 16 and FIG. 17 are free from the above mentioned shortcoming encountered in the prior art arrangement shown in FIG. 24 and the compactness has been achieved.

What is claimed is:

1. An intake air control system of an internal combustion engine having a plurality of cylinders supplied by separate fuel injectors for supplying fuel to selected ones of the plurality of cylinders in a part-cylinder mode operation, said system comprising:

an air induction system leading to the plurality of cylinders, said induction system including an induction passage having one end communicable with said plurality of cylinders;
a throttle blade disposed in said induction passage;
a throttle control lever connected to said throttle blade for controlling the angular position of said throttle blade;
an accelerator;
a first linkage means operatively interconnecting said accelerator and a remote portion of said throttle from an axis of rotation thereof; and
means for effecting an additional increase in the effective air flow area in said air induction system in response to a signal representing the part-cylinder mode operation, said effecting means including
a second throttle blade disposed in said induction passage upstream of the first throttle blade;
means for operatively interconnecting said second throttle blade with the first throttle blade;
said second throttle blade being smaller in dimension than the first throttle blade and movable within a chamber in said induction passage which is spaced from wall means for defining said induction passage to form an annular space therebetween;
valve means for closing said annular space; and
actuator means for selectively opening said valve means.

2. An intake air control system as claimed in claim 1, in which said valve means includes a tube coaxially arranged within said induction passage, said tube having an inner periphery defining said chamber within which said second throttle blade is movable, said tube being spaced from said induction wall defining wall means to form therebetween said annular space.

3. An intake air control system as claimed in claim 1 or 2, in which said valve means includes a cylindrical valve member slidably disposed along said induction passage defining means and movable between an open position and a closed position in which it defines said chamber within which said second throttle blade is movable.

4. An intake air control system as claimed in claim 2, in which said valve means includes a stationary annular plate disposed in said annular space and formed with a plurality of ports and a rotary annular plate rotatably disposed in said annular plate and formed with a plurality, corresponding in number to said plurality of ports of said stationary annular plate, of ports adapted to mate with said ports of said stationary annular plate, respectively, said rotary annular plate being rotatable between an open position in which said ports of said rotary annular plate are in alignment with said ports of said stationary annular plate and a closed position in which said rotary annular plate closes said ports of said stationary annular plate.

* * * * *